US006596105B2

(12) United States Patent

Kendall, Jr.

(10) Patent No.: US 6,596,105 B2
(45) Date of Patent: Jul. 22, 2003

(54) HIGH-SPEED LABEL APPLICATOR

(75) Inventor: Billy W. Kendall, Jr., Dacula, GA (US)

(73) Assignee: Rock-Tenn Company, Norcross, GA (US)

( * ) Notice: Subject to any disclaimer, the term of this patent is extended or adjusted under 35 U.S.C. 154(b) by 0 days.

(21) Appl. No.: 09/847,996

(22) Filed: May 3, 2001

(65) Prior Publication Data

US 2002/0162617 A1 Nov. 7, 2002

(51) Int. Cl.[7] .............................................. B32B 31/10

(52) U.S. Cl. ......................... 156/64; 156/238; 156/230; 156/285; 156/351; 156/361; 156/362

(58) Field of Search .......................... 156/64, 361, 351, 156/362, 566, 567, 568, 497, DIG. 38, DIG. 27, 285, 230, 238, 299, 302

(56) References Cited

U.S. PATENT DOCUMENTS 4,046,613 A 9/1977 Kucheck et al. ............ 156/249
4,842,660 A 6/1989 Voltmer et al. ............... 156/64
5,061,334 A 10/1991 Paules ........................ 156/235
5,232,540 A 8/1993 Southwell et al. .......... 156/361
5,254,189 A 10/1993 Hirobe et al. ................. 156/64
5,256,239 A 10/1993 Voltmer et al. ............. 156/362
5,413,651 A * 5/1995 Otruba ....................... 156/351
5,472,552 A 12/1995 Speranza et al. ........... 156/351
5,829,351 A 11/1998 Anderson et al. ............. 101/36
5,964,975 A * 10/1999 Hinton ....................... 156/215
5,968,303 A * 10/1999 Nagasaka .................. 156/249

* cited by examiner

*Primary Examiner*—Richard Crispino
*Assistant Examiner*—George R. Koch, III
(74) *Attorney, Agent, or Firm*—Schwegman, Lundberg, Woessner & Kluth, P.A.

(57) ABSTRACT

A label applicating system includes a label transport wheel and an air-pressure system connected to an opening in the label transport wheel. The air-pressure system applies a positive pressure at the opening to eject a label from the wheel onto a surface of an article. One aspect includes means for applying an upward force to the bottom surface of the article approximately simultaneously with ejecting the label from the label-holding sector. One aspect provides a controller which receives a signal from a sensor indicating a location of the article and in response to the signal, sends a first signal to a motor which rotates the wheel so that the label-holding sector is facing a top surface of the article.

14 Claims, 9 Drawing Sheets

HIGH-SPEED LABEL APPLICATOR

FIELD OF THE INVENTION

This invention relates to the field of mechanisms, and more specifically to a label applicating mechanism.

BACKGROUND

Labeling machines are used for applying labels to boxes, bottles, and other items. These labels may include product information, warnings, or include anti-theft devices.

Typically, a labeling system includes a label applicator and a conveyor for transferring an article to be labeled to the label applicator. One type of label applicator uses a cylindrical drum as the label applicator. For instance, a pressure-sensitive label is transferred from a cylindrical drum to a continuously moving article by bringing the label into direct contact with the surface of the article. As the drum continues rotating and the article continues moving, the label peels off the drum and onto the article.

Such labeling machines can be improved. With increasing use of labels, it is important to speed up the process of applying labels to articles. This can lower the cost of the overall item to the consumer. It is also important that the labels are accurately placed so that they do not cover up other information on the article.

SUMMARY

Accordingly, methods and apparatus have been devised to provide a high-speed, accurate labeler. In one embodiment, a label applicating system includes a label transport wheel and an air-pressure system connected to an opening in the label transport wheel. The air-pressure system applies a positive pressure at the opening to eject a label from the wheel onto an article. A motor rotates the label transport wheel so that the label is facing an article to be labeled.

One aspect provides a labeling system including a label transport wheel having a label-holding sector and a motor for rotating the label transport wheel. The system further includes means for applying a momentary upward force on a bottom surface of an article to be labeled and means for ejecting a label from the label-holding sector onto a top surface of the article approximately simultaneously as the upward force is applied to the bottom surface of the article.

One aspect provides a label applicating system including a wheel having a plurality of label-holding sectors around an outer surface of the wheel, each of the label-holding sectors having an opening, an air-pressure system for applying a vacuum or a positive pressure at the opening of each of the label-holding sectors, a motor for rotating the wheel, a sensor for sensing a location of an article relative to the wheel as the article travels along a path relative to the wheel, and a controller coupled to the air-pressure system, the motor, and the sensor. The controller receives a signal from the sensor indicating the location of the article and in response to the signal, sends a first signal to the motor which rotates the wheel so that one of the plurality of label-holding sectors is facing a top surface of the article when the article is positioned beneath the wheel. The label is then ejected from the one label holder-sector onto the top surface of the article.

A method of labeling according to one embodiment includes delivering a label to a label transport member; positioning the label transport member so that the label is above the article when the article is beneath the label transport member; and ejecting the label from the label transport member onto a top surface of the article.

DETAILED DESCRIPTION

Figure 1:
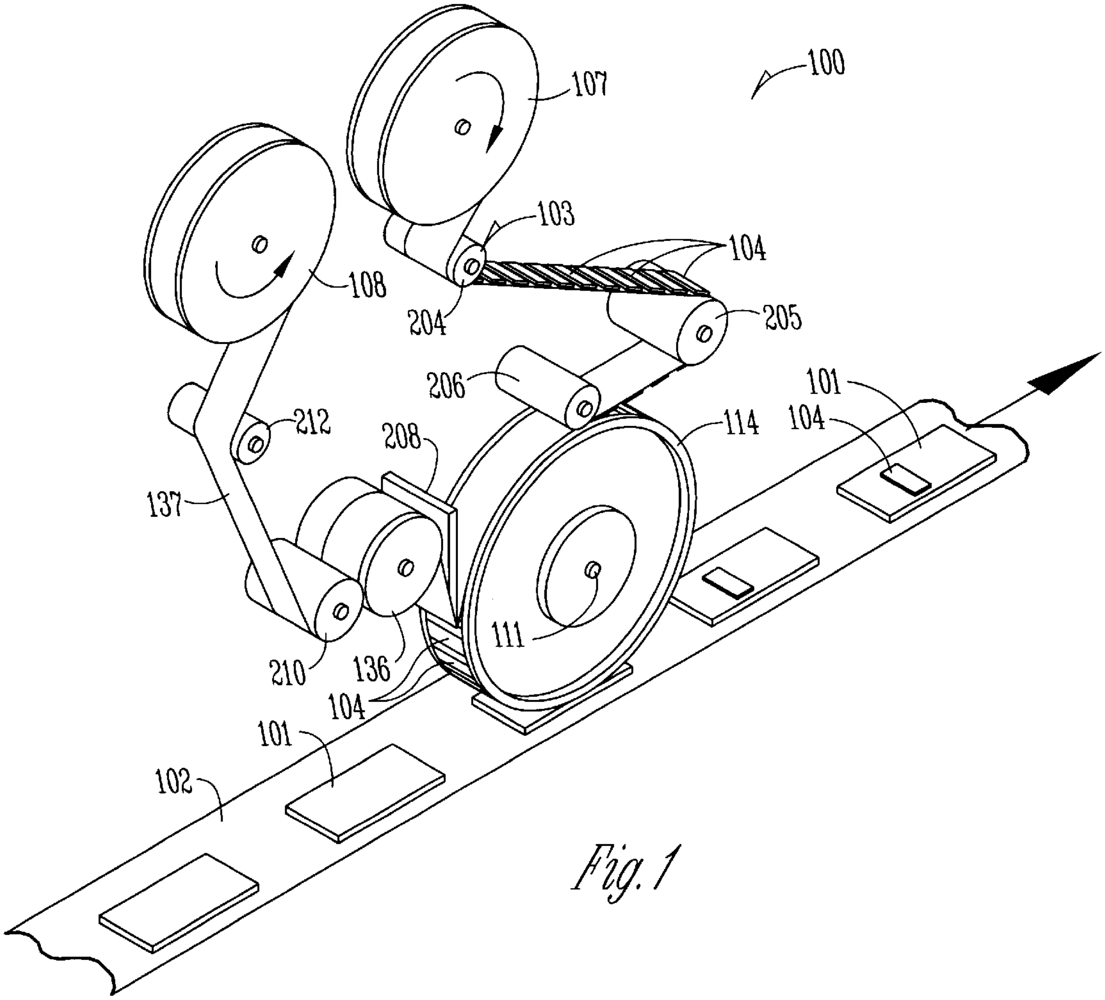
FIG. 1 shows a perspective view of a labeling system according to one embodiment of the present invention.

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

Overview of Method and System

In one or more of the embodiments to be discussed below, the present labeling system provides a high-speed method of applying labels to articles; provides an accurate method of applying labels to articles; provides a mechanism which applies labels axially, transversely, or other angle relative to the path of the articles being labeled; provides a relatively simple, elegant mechanism which has fewer breakdowns and maintenance problems; and/or provides a mechanism which can apply labels to flat empty cartons at high speeds.

The system generally includes transporting a label to a label ejection point, wherein the label is positioned over the article to be labeled, and ejecting the label onto the article.

In one embodiment of the present labeling system, this method is provided by a label transport wheel, an air-pressure system, a sensor, and a controller. The present system cooperatively positions and controls these members so that labels are picked up by the label transport wheel, the wheel rotates to a label ejection position in response to a signal from the controller, and the air-pressure system ejects the label from the wheel onto an article. In one example, the controller rotates the wheel using a servo-motor and takes into account a position of the article relative to the wheel received via a signal from the sensor to accurately rotate the wheel to approximate the speed of the moving article. Moreover, the air pressure system is controlled so that air pressure and vacuum streams are timed to control the article being labeled and to control the action of the label itself. It is noted that the present system does not merely speed up or slow down the wheel in response to the position of each article. In one example, the controller uses a servo-motor to control the rotation of the wheel for each article as the articles come down the line so that the air-pressure system ejects the label at the precise moment the article is correctly positioned. This helps provide the high speeds of the present system since each and every article is individually sensed and labeled by the system.

Accordingly, one or more aspects of the present invention can be combined to provide a labeling system which applies each label in a single ejection step instead of peeling each label onto the article. This series of discrete application periods allow the speed of the system to be increased without any degradation of performance. For instance, in one embodiment the articles are transported along an article transfer device, such as a conveyor, and labeled at a rate of approximately 50,000 an hour.

System and Apparatus

Figure 2:
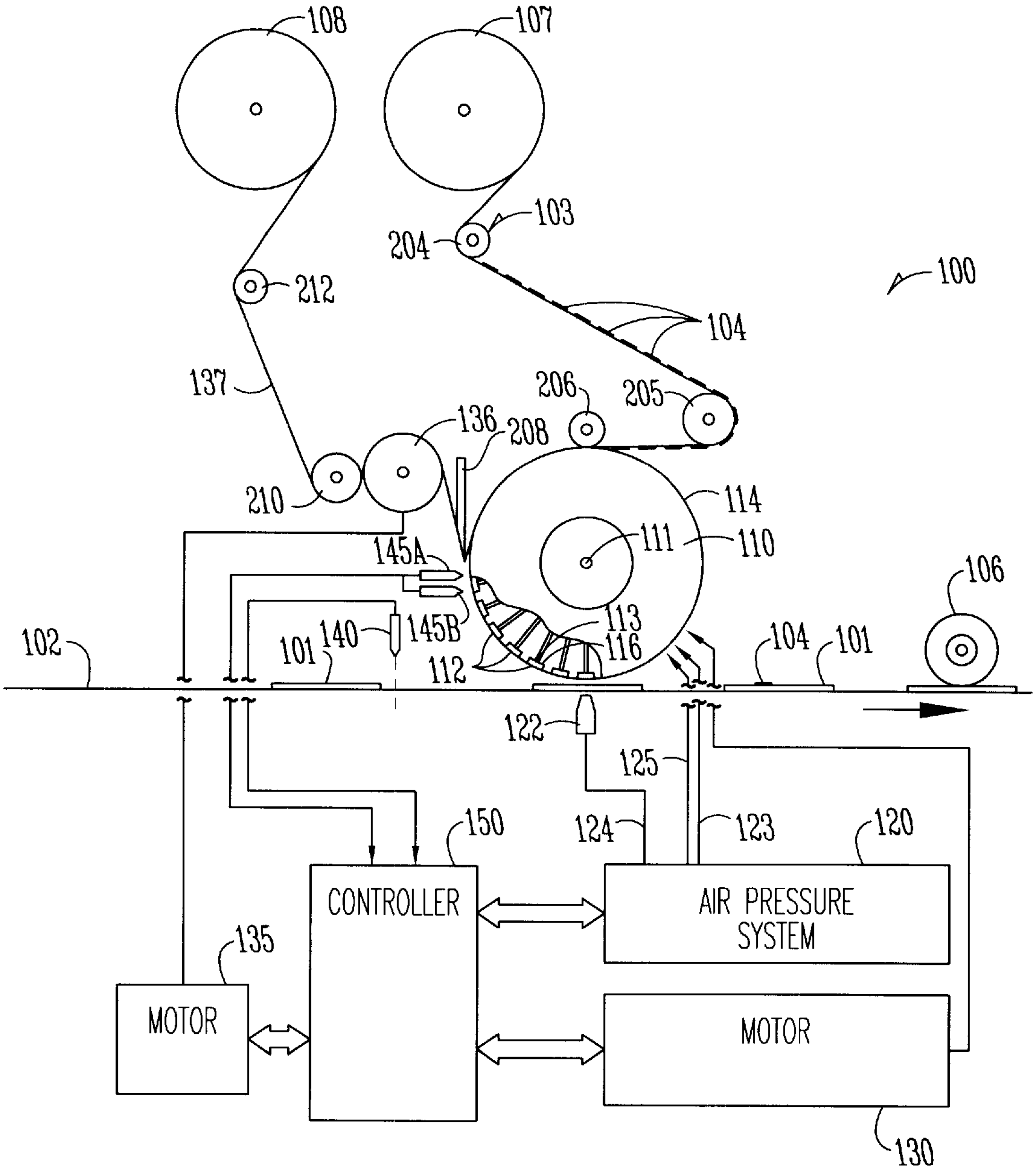
FIG. 2 shows a schematic representation of the labeling system of FIG. 1.

One embodiment of the present system is shown in FIGS. 1 and 2. FIG. 1 shows a perspective view of a labeling system 100 according to one embodiment while FIG. 2 shows a schematic representation of the labeling system. Labeling system 100 labels a series of articles 101 as the articles are transported down a path via a transfer device 102, such as a conveyor. Articles can includes boxes, cartons, envelopes, paper, or other objects. As used herein, labels includes pressure-sensitive labels, windows, glueable labels, anti-theft devices, such as labels 104, and other items. Transfer device 102 is driven by conventional means. In various examples, transfer device 102 can be driven at a speed of up to 2000 feet/minute. One or more wheels or rollers 106 may be provided to help retain articles 101 upon the transfer device or conveyor surface. Some embodiments omit wheels 106.

Labeling system 100 generally includes a label delivery apparatus 103, a label transport wheel 110, an air pressure system 120, one or more motors 130 and 135, one or more sensors 140, 145A, and 145B, and a controller 150. Label delivery apparatus 103 generally includes a label strip delivery reel 107 and a label tape take-up reel 108 having a series of roller and pulleys therebetween for transporting a label strip 137 through the system. Further details of label delivery apparatus 103 will be described below.

In one embodiment, label transport wheel 110 includes a cylindrical drum shape having a substantially circular profile around a rotational hub 111. As used herein, "wheel" does not necessarily refer to a circular object. In some embodiments, one or more of the outer surface portions of wheel 110 are flat, thus providing a polygonal shape.

In one embodiment, label transport wheel 110 includes a plurality of label-holding sectors 112 located around an outer surface 114 of the wheel. Each of the label holding sectors 112 are equally spaced from each other. As wheel 110 rotates around hub 111, each of label-holding sectors 112 are, in turn, positioned facing the top surface of conveyor 102. In one embodiment, each of label-holding sectors 112 include a pocket or indent 113 for providing a holding space for a label or other member. This helps provide accurate positioning of the labels on the label transport wheel since the sides of the labels are restricted from moving by the side surfaces which define indents 113. This allows the labels to be accurately placed upon the article being labeled. In various embodiments, different sized wheels and wheels having varying sizes and numbers of sectors 112 can be used. In one embodiment, which will be described in more detail below, indents 113 are omitted from the wheel and a generally smooth outer surface 114 is utilized.

In a bottom surface of each sector 112 are one or more openings 116. Openings 116 are communicatively coupled to air pressure system 120, which alternatively provides a vacuum, neutral pressure, or positive pressure at the opening. For instance, the vacuum picks a label 104 off of a label strip 137 when the label strip is positioned proximate to the outer surface 114 of the wheel 110. The vacuum then holds the label within sector 112 while the wheel 110 is rotated and positioned so that the application surface of the label is facing transfer device or conveyor 102.

When the label is positioned facing the top surface of an article on conveyor 102, the vacuum is changed to a positive pressure at opening 116 which ejects the label from the sector. The air pressure system applies a high enough pressure so that the label is ejected in a single step. In other words, the label as a whole is ejected at one time from label holding sector 112. As used herein, "ejected" means that the label is forced or expelled out of the label holding sector. The label travels towards article 101 so that the application surface of the label is generally parallel to the top surface of the article (as opposed to being peeled onto the article). In one example, an air pressure within the range of 20–40 psi is used. Other pressures are also within the scope of one or more embodiments of the present system.

Air-pressure system 120 includes one or more vacuum/positive pressure pumps for applying a vacuum or a positive pressure at the opening of each of label-holding sectors 112 via one or more hoses 123 and 125 which communicate with passages within wheel 110 which are connected to openings 116. In one embodiment, one or more of the functions of air-pressure system 120 are controlled by controller 150.

In one embodiment, system 100 includes a nozzle 122 located under transfer device 102. Nozzle 122 is coupled to air-pressure system 120 by a hose 124 and the airflow through the nozzle is controlled by controller 150 or by a mechanical or electromechanical valve. Transfer device 102 can include an air-permeable surface, allowing an air stream to pass through it. Nozzle 122 directs a positive air flow to a bottom surface of a box or other article 101 as the article is beneath wheel 110. In one embodiment, the airflow through nozzle 122 is regulated by a mechanical valve. In another embodiment, controller 150 sends a signal to air pressure system 120 which causes an air-flow through nozzle 122 when an article is above the nozzle and beneath wheel 110. In one example, the air-flow from nozzle 122 is timed by controller 150 to correspond with the timing of opening 116 and the position of article 101 beneath wheel 110 so as to provide a lift of article 101 at the correct label placement location and time. This underneath air-flow helps momentarily hold or pause the article to provide for accurate labeling, while still allowing the conveyor to keep moving along at up to 2000 feet/minute. This helps allows accurate placement of up to 50,000 labels/hour.

Motor 130 rotates label transport wheel 110. In one embodiment, motor 130 includes a servo-motor. Motor 130 is coupled to controller 150 which sends signals to the servo-motor depending on the location of an article 101 on conveyor 102 (as sensed by sensor 140). Servo-motor 130 is adapted to position each of label-holding sectors 112 so that each sector faces the surface of transfer device 102 in turn as wheel 110 rotates and in response to the position of an article upon the conveyor. In one embodiment, the servo-motor turns the wheel 110 so that it momentarily pauses as each label holding sector 112 is facing the conveyor 102. At this pause point or ejection point, the label is ejected from the label holding sector. Accordingly, label transport wheel 110 is driven and positioned by the servo-motor 130 to serially or sequentially position the wheel so that each label holding sector 112 is sequentially facing an article to be labeled on conveyor 102.

Motor 135 drives and rotates pulley 136. This pulls label strip 137 through the system. In one embodiment, motor 135 is a servo-motor which is controlled to have a rotational speed such that the label strip is pulled past wheel 110 at the same speed as the outer surface 114 of the wheel is moving.

In one embodiment, label strip 137 is maneuvered through the system as follows: the strip starts at delivery reel 107, then past an idler pulley 204 and an idler pulley 205. Idler pulley 205 is positioned relative to wheel 110 such that label strip 137 is delivered tangentially against the upper surface of wheel 110 where a roller or pulley 206 is located. Pulley 206 is either a statically coupled roller or a pinch roller which is forced by a spring or other tension member against the upper outer surface of wheel 110 to guide and/or hold label strip 137 against surface 114 of wheel 110. Labels 104 on the strip 137 are removed by vacuum suction from the strip and are positioned within sectors 112. In one embodiment, label strip 137 continues against the surface for approximately a 90 degree arc.

Pulley 136 then pulls the strip past a peeler bar 208 and draws the empty strip 137 away from wheel 110 after a label 104 has been removed from it via vacuum suction. A pulley or pinch roller 210 is forced against driven pulley 136 to help grip the empty tape and pull it through the system. An idler pulley 212 provides tension before the empty label strip is put onto take-up reel 108. In this embodiment, take-up reel 108 is driven by a motor to take-up the empty strip. Although pulley 136 is the driven wheel in the present example, other embodiments drive one or more other wheels or pulleys.

Sensor 140 is positioned to sense an article as it travels along the path of transfer device 102. In one embodiment, sensor 140 is a light sensor. In one embodiment, sensor 140 senses a front edge of article 101. In other examples, the sensor can sense the back edge of the article or it can sense a distinguishing feature on the article, such as a line or open space. Sensor 140 is coupled to controller 150. In this example, as the front edge of article 101 triggers sensor 140, a signal is sent to controller 150 which in turn sends one or more signals to motors 130, 135, and/or air pressure system 120. In response to these signals and in light of the known speed of transfer device 102, the controller knows when to rotate the wheel to eject a label onto the article as it passes under the wheel.

Sensor 145A senses the position and speed of wheel 110 as the wheel rotates. In one embodiment, a series of equally spaced index sections are located around wheel 110 and sensor 145A senses each index section as the section passes by the sensor. This sensed information is sent to controller 150 which enables the controller to send a signal to motors 130, 135, and/or air pressure system 135. Sensor 145B is an optional sensor which senses the location of a label on wheel 110. This sensor is utilized when the wheel does not include pockets 113. In such an embodiment, the precise location of a label on the wheel must be sensed and transferred to controller 150 to allow the controller to know where the label is.

As discussed above, controller 150 is coupled to one or more of air-pressure system 120, motors 130 and 135, and sensors 140, 145A, and 145B. Controller 150 receives a signal from sensor 140 as each article 101 passes the sensor. In response to the signal, controller 150 sends a first signal to motor 130 which rotates wheel 110 so that one of the plurality of label-holding sectors 112 is facing a top surface of the article when the article is positioned beneath wheel 110. As will be discussed below, a valve member within wheel 110 causes a positive pressure when a label-holding sector is facing downward toward the conveyor surface. Alternatively, in some embodiments controller 150 sends a second signal to air-pressure system 120 which applies a positive pressure at the opening 116 of a label-holding sector 112 to eject a label from the one label holder-sector onto the top surface of the article. In one embodiment, a third signal is sent to air-pressure system 120 which causes a positive air pressure stream out of nozzle 122. Details of the process of controller 150 will be discussed below.

The combination of servo-motor 130 sequentially and accurately rotating label transport wheel 110 in response to a signal from controller 150 based on the location of the article, along with an air-stream from nozzle 122 which helps momentarily pause and lift the article 101 in place, and an airstream from opening 116 which ejects the label quickly and accurately from the wheel, allows a label to be accurately and quickly placed upon article 101.

Figure 3A:
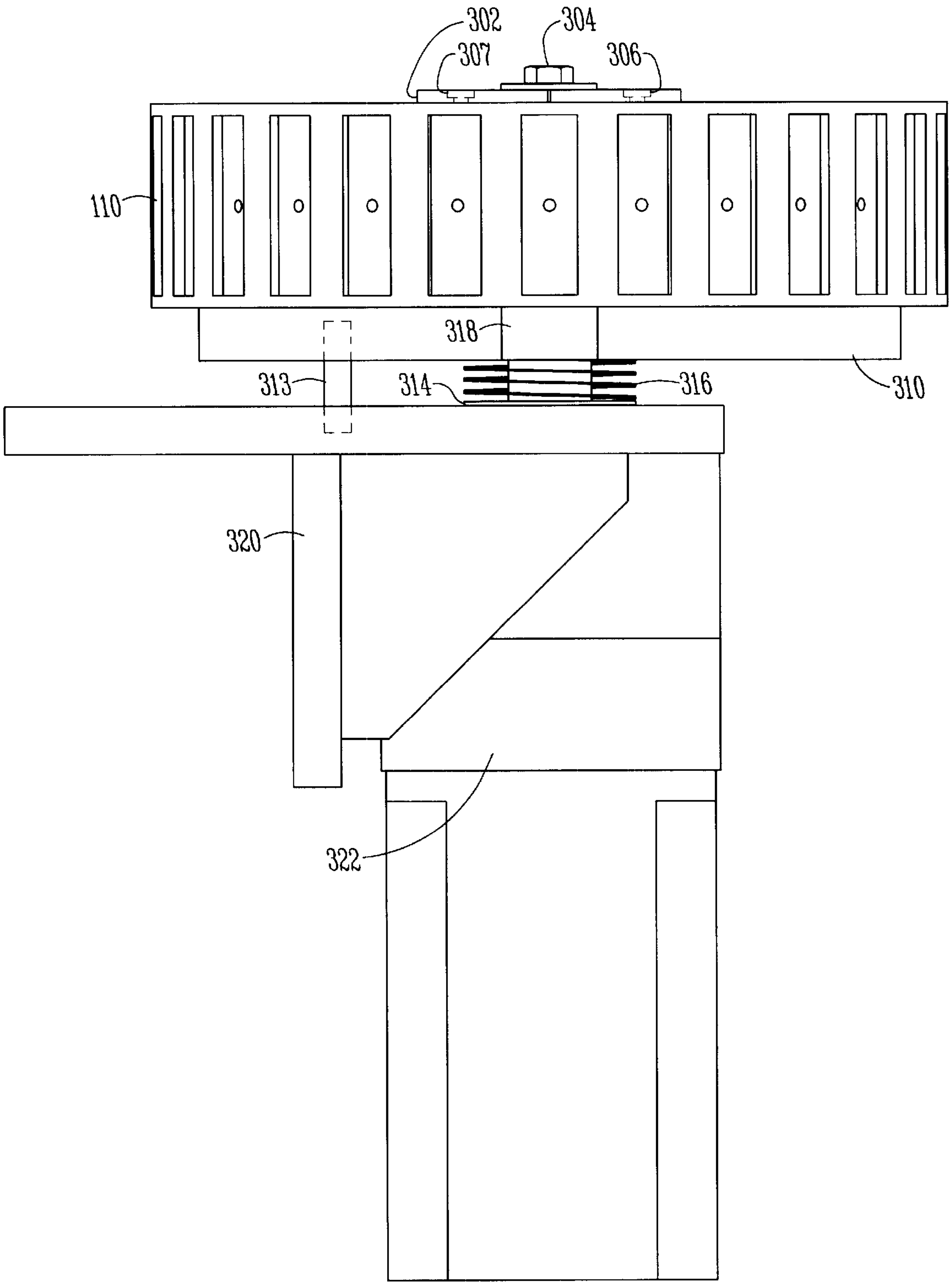
FIG. 3A shows a bottom view of the label transport wheel according to one embodiment.

FIGS. 3A–3F show further details of label transport wheel 110. FIG. 3A shows a bottom view of the label transport wheel according to one embodiment. In this embodiment, wheel 110 rotates via a shaft 318 which is coupled to a motor such as motor 322. One or more brackets or supports 320 are used to mount and support the motor. A bolt 304 couples a front collar 302 to shaft 318. In one embodiment, one or more posts or fasteners 306 and 307 are connected between front collar 302 and wheel 110 to connect the collar to the wheel and thus help rotate the wheel as shaft 318 rotates. One embodiment includes four fasteners such as fasteners 306 and 307. Some embodiments include a key on shaft 318 to also rotate the wheel.

A valve plate member 310 is positioned on the back side of wheel 110. A spring 316 is located between valve plate member 310 and a washer 314. In this embodiment, washer 314 would ride against the front surface of motor 322 or against bracket 320. Some embodiments omit the washer and the spring rides directly against the bracket or face of the motor. Spring 316 helps force valve member 310 against the back surface of the wheel. One or more alignment pins 313 are attached to valve plate member 310 and extend from the rear surface of the valve plate member. Alignment pin 313 is positioned to prevent valve plate 310 from rotating relative to wheel 110. For instance, a stop can extend from motor 322 or from another portion of the mechanism, such as mount 320, for alignment pin 313 to butt up against and thus not rotate along with the rest of the wheel. The air pressure system described above is operatively coupled to valve plate 310. As noted, valve plate member 310 does not rotate along with wheel 110. Instead a seal is formed between the valve plate and the wheel and valve plate 310 is held in place by the force of spring 316 and by suction within the wheel as the wheel rotates and the valve plate is kept from rotating by alignment pin 313 or equivalent means.

Figure 3C:
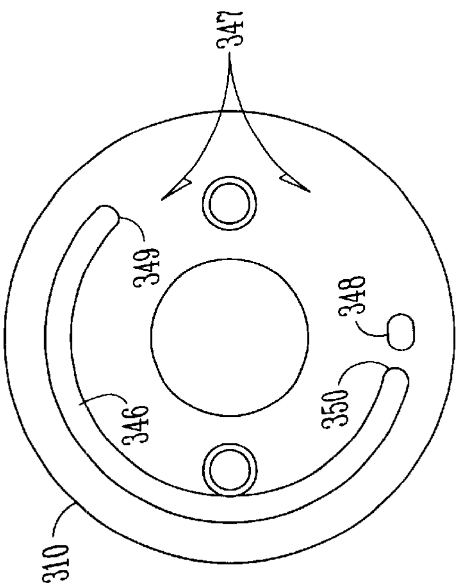
FIG. 3C shows a front view of a valve member of the label transport wheel according to one embodiment.
Figure 3B:
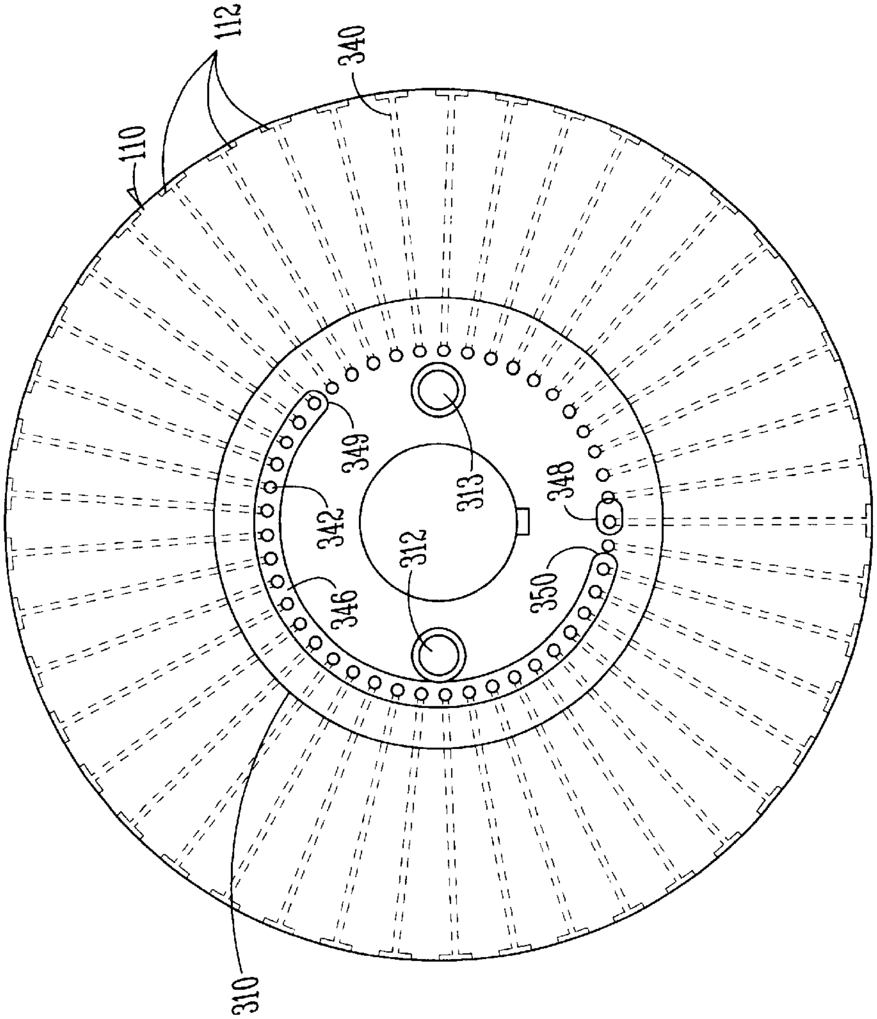
FIG. 3B shows a front view of further details of the label transport wheel of FIG. 3A.

FIGS. 3B and 3C show further details of the label transport wheel and valve plate member 310. As noted above, wheel 110 includes a plurality of equally space label-holding sectors 112. A passage 340 connects each label holding sector to an aperture 342 at the inner end of each passage 340.

Valve plate member 310 regulates the flow and pressure of the air present at each sector 112. In one embodiment, valve plate member 310 includes an opening 346 which communicates with the air pressure system so that a vacuum is applied along opening 346. In one embodiment opening 346 has a semi-circle shape extending around the surface of valve member 310. As wheel 110 rotates relative to valve member 310, each aperture 342 sequentially becomes exposed to opening 346 and the vacuum of opening 346 is transferred by passage 340 to each label-holding sector 112. Accordingly, each sector 112 has a vacuum applied to it from a first point 349 to a second point 350 of opening 346.

Valve plate member 310 also includes another opening 348 which is coupled to the air-pressure system for applying a positive high-pressure at opening 348. Thus, as wheel 110 rotates, each aperture 342 is sequentially proximate a neutral pressure zone 347, vacuum section 346, and high-pressure section 348.

Figure 3D:
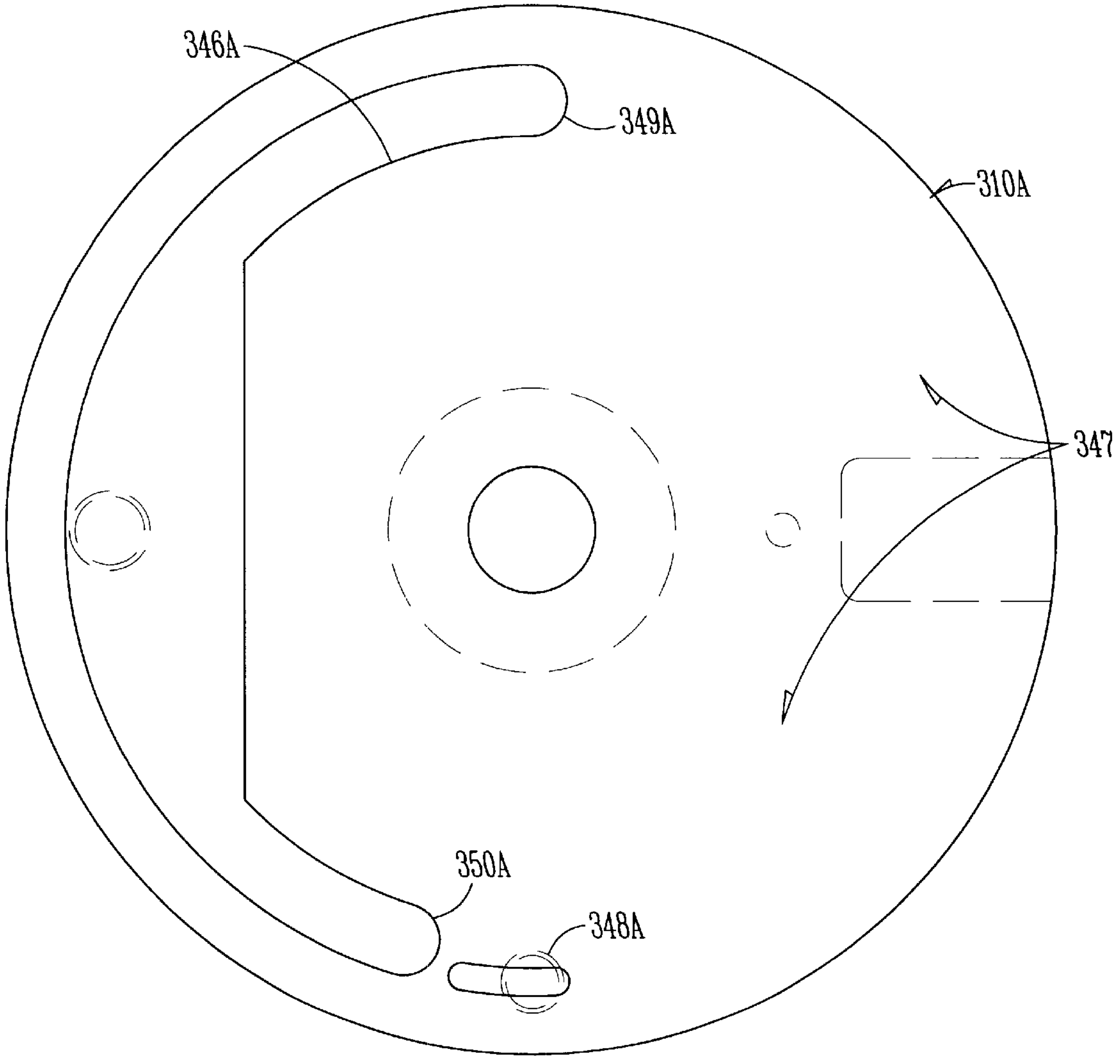
FIG. 3D shows a front view of a valve member of the label transport wheel according to another embodiment.

FIG. 3D shows a front view of a valve member 310A of a label transport wheel according to another embodiment. Valve member 310A is similar to valve member 310 described above. In this embodiment, valve plate member 310A includes an opening 346A which communicates with the air pressure system so that a vacuum is applied along opening 346A. In one embodiment opening 346A has a semi-circle shape extending around the surface of valve member 310A. As wheel 110 rotates relative to valve member 310A, each aperture of the wheel (such as apertures 342 of FIG. 3B) sequentially becomes exposed to opening 346A and the vacuum of opening 346A is transferred by a passage to each label-holding sector 112 (See FIG. 3B). Accordingly, each label-holding sector has a vacuum applied to it from a first point 349A to a second point 350A of opening 346.

Valve plate member 310A also includes another opening 348A which is coupled to the air-pressure system for applying a positive high-pressure at opening 348A. Thus, as wheel 110 rotates, each aperture of the wheel is sequentially proximate a neutral pressure zone 347, vacuum section 346A, and high-pressure section 348A.

Figure 3E:
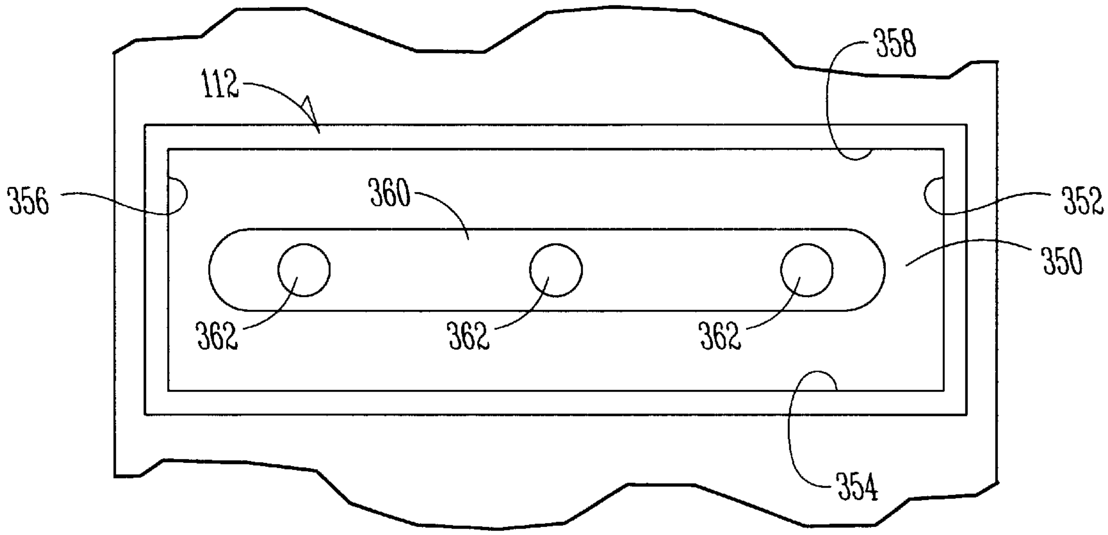
FIG. 3E shows a top view of a label holding sector of a label transport wheel according to one embodiment.
Figure 3F:
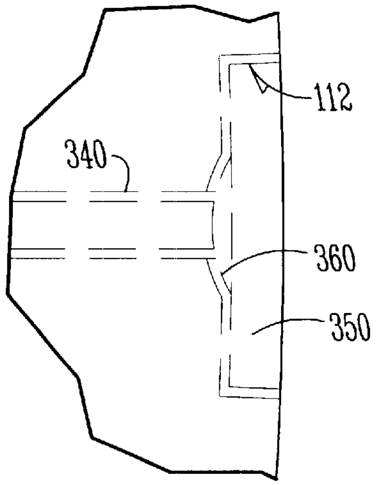
FIG. 3F shows a side view of the label holding sector of FIG. 3E.

FIGS. 3E and 3F show a top view and a side view respectively of a label holding sector 112 of a label transport wheel according to one embodiment. Label holding sector 112 includes an indentation 350 defined in part by four side walls 352, 354, 356, 360. In one embodiment, indentation 350 is dimensioned to hold a given label therein. For example, one embodiment is dimensioned to hold a security label therein. Side walls 352, 354, 356, and 360 are generally non-parallel relative to the bottom surface of indentation 350. Some embodiments provide perpendicular side surfaces. Other embodiments provide one or more angular surface side walls. In one embodiment, the side surfaces match the side edge surfaces of a given label, thus providing a tight registration of the label within the indentation.

In one embodiment, a second indentation or groove 360 is located in the bottom of indentation 350. One or more holes 362 are positioned in the bottom of groove 360. The holes 362 are connected to passage 340. The air pressure at holes 362 is varied as discussed above. Groove 360 helps evenly administer air pressure through holes 362. Accordingly, the air pressure on the bottom surface of a label is relatively consistent along the surface of the label. This provides that the label is ejected from sector 112 having a relatively parallel orientation relative to the sector. Other embodiments use different numbers of holes 362. One, two, three, or more can be used. Some embodiments omit groove 360 or provide a different shape for the groove.

Figure 4:
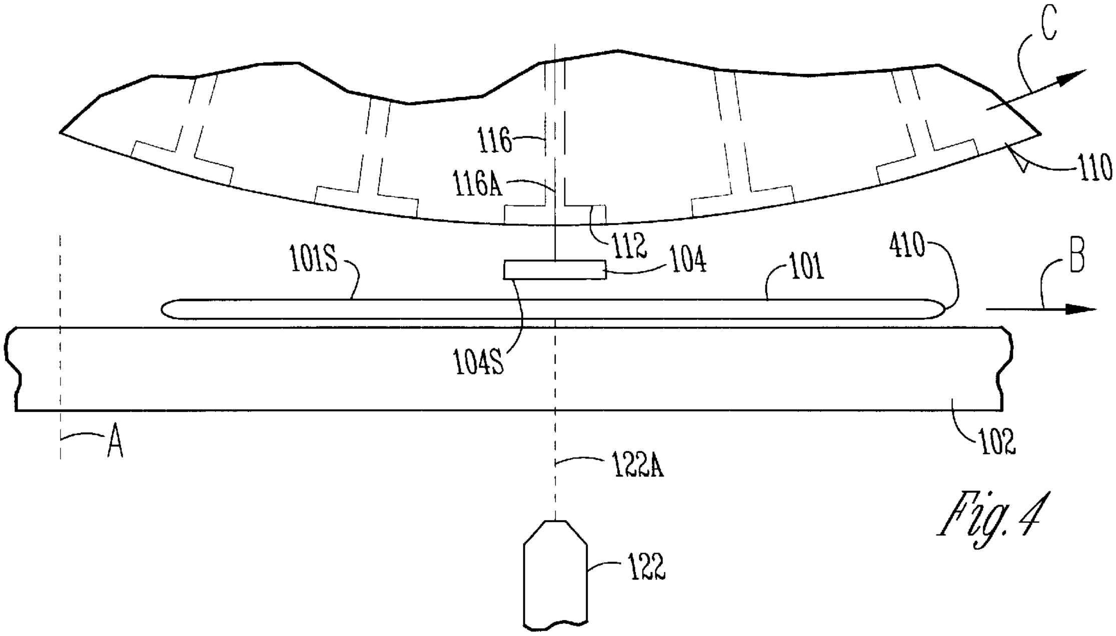
FIG. 4 is an enlarged side view of a labeling system according one embodiment applying a label to an article.

FIG. 4 is an enlarged side view a portion of labeling system 100 applying a label 104 to an article 101. Article 101 is moving along transfer device or conveyor 102 in the direction indicated by arrow B, which in this perspective is rightward. Wheel 110 is rotating in a counterclockwise direction indicated by arrow C. It is assumed that when the front edge 410 of article 101 had gone past point A, a sensor located at point A had sent a signal to controller 150 (See FIGS. 1 and 2). The controller had processed the signal and sent a message to the servo-motor to turn wheel 110 so that label holding sector 112 would be positioned facing conveyor 102 and the top surface of article 101 when article 101 reached the position shown in the figure. This position is called the ejection position. When in this position, valve member 310 (See FIGS. 3C and 3D) causes a positive air pressure stream 116*a* through opening 116 of label-holding sector 112.

In an alternative embodiment, the controller sends a signal to air-pressure system 120 to emit a second positive air stream 122A through nozzle 122 when the label holding sector 112 is in the ejection position.

In one embodiment, air stream 116A blows label 104 out of sector 112 so that a major surface 104S of the label is generally parallel with conveyor 102 and a top surface 101S of article 101 as the label descends from sector 112 to article 101. This provides that substantially the entire surface 104S of label 104 contacts top surface 101S of article 101 simultaneously. This ejection system helps provide a fast labeling process since the wheel can begin turning again immediately after ejecting the label and does not have to be in physical contact with the label as the label is placed upon the article. It is noted that the label can be tilted or angled on its descent to the article, while still being considered generally parallel.

Airstream 122A also helps provide a faster and more accurate labeling system. As noted above, in one embodiment conveyor 102 is air permeable and allows air stream 122A to contact the bottom surface of article 101. The airstream then provides a lift or slight pause in the movement of the article allowing the label to be place consistently on each of a series of articles. Some embodiments omit nozzle 122 and airstream 122A and the label is ejected from sector 112 as the article passes the ejection point.

System 100 is programmable so that the given location of label 104 on article 101 can be varied. For example, controller 150 is given the distance between point A and the location on the article on which the user wants the label located. The controller also knows the speed of the conveyor. By using those two factors, a user can program the controller to rotate the wheel the required amount so that air-streams 116A and 122A are emitted at the desired time.

Figure 5A:
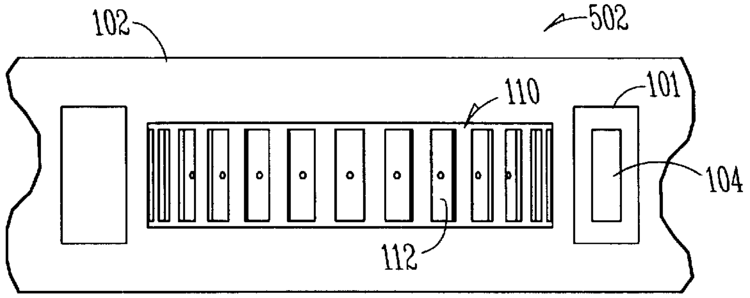
FIGS. 5A and 5B show top views of two orientations of a label transport wheel according to one embodiment.
Figure 5B:
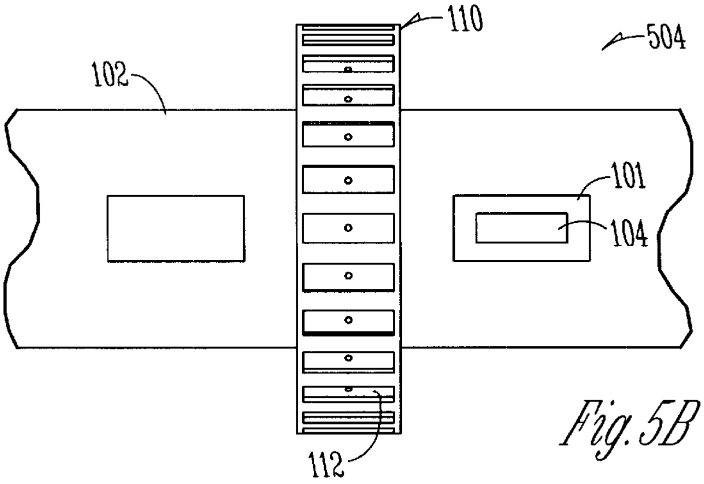

In one embodiment, the labeling system 100 described above provides that the label is attachable to the article at a variety of orientations For example, FIGS. 5A and 5B show top views of two possible orientations, 502 and 504, of label transport wheel 110. Orientation 502 in FIG. 5A is similar to the orientation describe and shown above in FIGS. 1–4. In this orientation, wheel 110 rotates in the same direction as the movement of conveyor 102. In orientation 504 in FIG. 5B, wheel 110 is perpendicular to conveyor 102. This orientation is desirable if either the article 101 or the label 104 is dimensioned so that the label needs to be located in a position which is difficult using orientation 502. Since system 100 ejects label 104 from wheel 110, (See FIG. 4) instead of directly applying it, the present system allows the label applicating wheel to move at a different angle relative to the conveyor. It is noted that various angles are possible using the present system. For instance, the wheel can be angled 45 degrees relative to the conveyor. Other examples include virtually any other angle.

Figure 6:
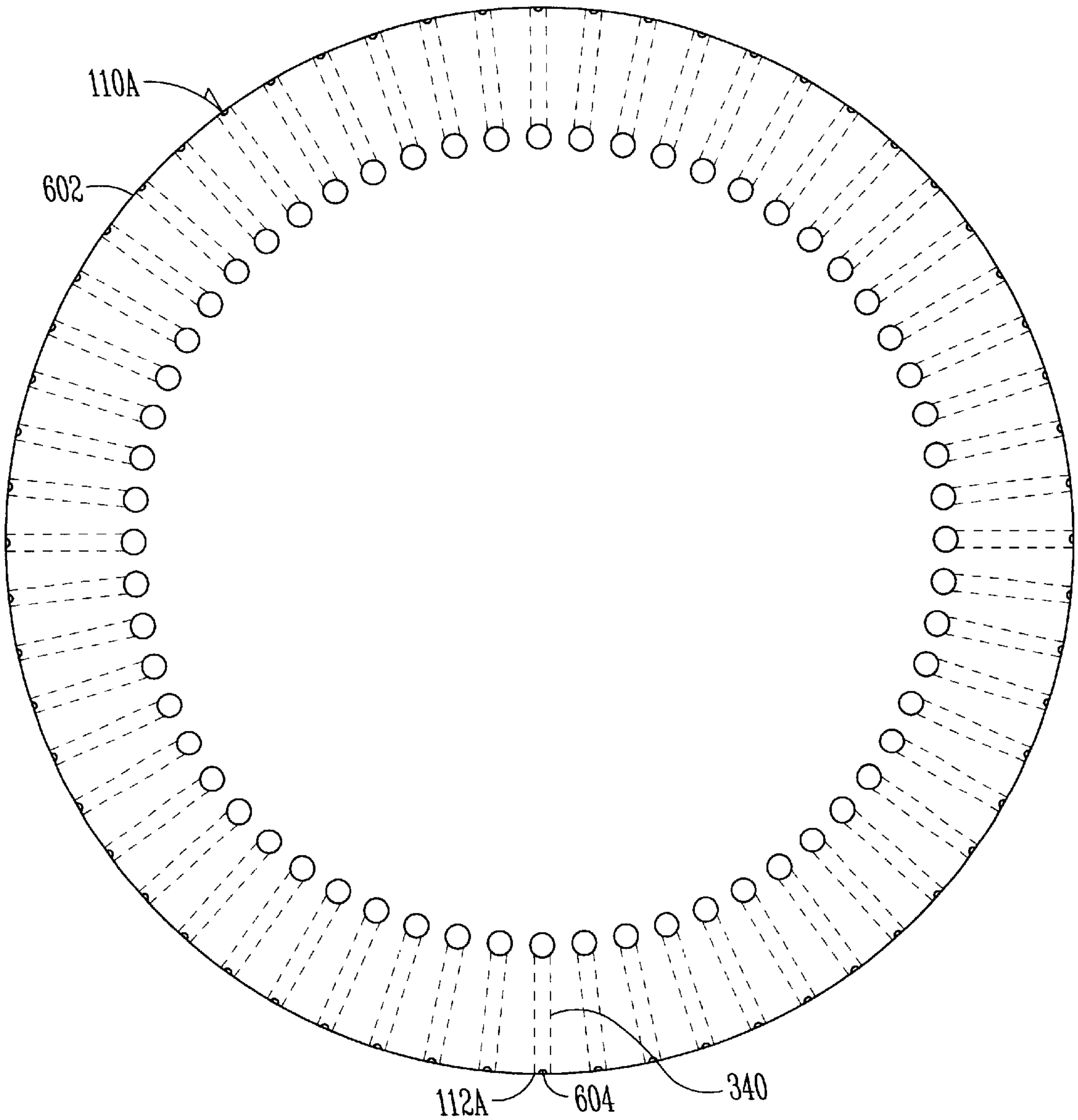
FIG. 6 shows a front view of a label transport wheel according to one embodiment.

FIG. 6 shows a wheel 110A according to one embodiment. Wheel 110A is similar to wheel 110 and similar features will not be described for sake of brevity. Wheel 110A does not include indents 113. Instead, wheel 110A has a substantially smooth outer surface 602. Each passage 340 extends all the way to surface 602 at an opening 604 at each label holding sector 112A. A groove can be included at the outer surface analogous to grooves 360 (See FIG. 3E). This embodiment is advantageous for putting thin members onto articles. For example, it is useful for putting windows onto envelopes. In this embodiment, the windows are delivered as in FIG. 1, but instead of being positioned within indents 113 they are simply held in place on the surface 602 at each label holding sector 112A by suction delivered via openings 604. In this embodiment, sensor 145B (FIG. 2) is utilized to tell the controller the position of the label, such as a window, upon the wheel. This position, along with the position of the article upon the conveyor allows the controller to precisely place the window on the correct position of the article.

Figure 7:
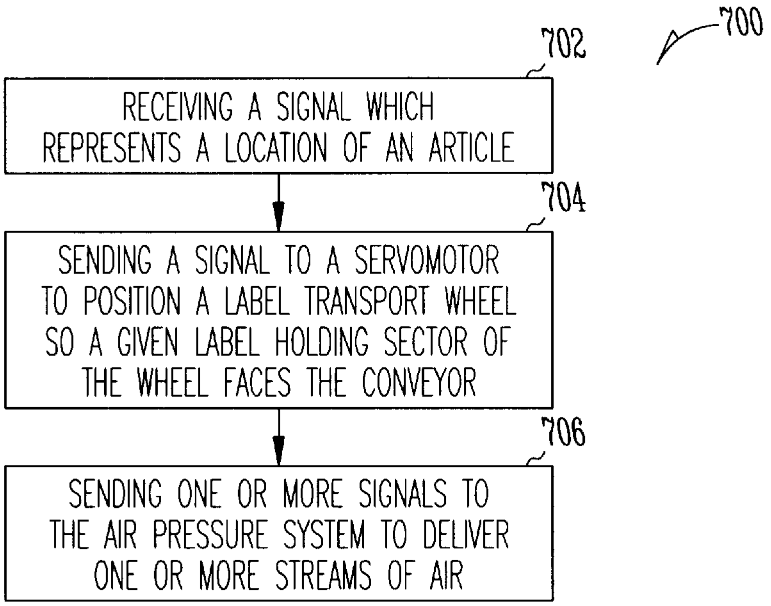
FIG. 7 is a flowchart depicting a method of applying a label according to one embodiment.

In one embodiment, controller 150 is programmed as shown in FIG. 7, which shows a flowchart depicting a method 700 of applying a label according to one embodiment.

Method 700 includes a first block 702, which includes receiving a signal which represents a location of an article to be labeled as the article travels along a conveyor path. In one embodiment, as described above, (See FIG. 2), this is accomplished by sensor 140 detecting the front edge of each article 101 as a plurality of articles 101 move along the conveyor and sending an appropriate signal to controller 150. Alternatively, the back edge of each article could be sensed.

Method 700 also includes a second block 704, which includes sending a signal to a servo-motor to position a label holding wheel so that a given label holding sector of the wheel faces the conveyor. Again, referring to FIG. 2, this is accomplished by controller 150 receiving a signal from sensor 145A indicating the position of the wheel and then sending a signal to servo-motor 130, which in turn rotates wheel 110 as needed. Again, the present system does not merely speed up or slow down the wheel in response to the position of each article. The present system uses a servo-motor to control the rotation of the wheel for each article as the articles come down the line so that the air-pressure system ejects the label at the precise moment the article is correctly positioned. This helps provide the high speeds of the present system since each and every article is individually sensed and labeled by the system.

In one embodiment, a valve member such as member 310 or 310A of FIGS. 3C and 3D causes a first air pressure stream to eject the label from the label-holding sector onto the article after the wheel has been rotated by servo-motor 130.

Method 700 optionally includes a third block 706, which includes sending one or more signals to the air pressure system to deliver one or more streams of air. For instance, in one embodiment a second stream of air is directed at a bottom surface of the article substantially simultaneous with the first stream. Referring to FIG. 2, this is accomplished by controller 150 sending a signal to air-pressure system 120 which then emits a positive pressure air stream to wheel nozzle 122 when the wheel has been rotated as in block 704. In some embodiments, controller 150 sends a second signal to air-pressure system 120 which then emits a positive pressure air stream to wheel 110 when the wheel has been rotated for ejecting the label from the label-holding sector.

Accordingly, by timing the delivery of the air pressure and the rotation of the wheel relative to the speed and position of the article, the present system allows for high-speed, accurate placement of labels.

In various embodiments, one or more of the blocks described above are changed or omitted depending on the specific labeling task of the user.

Example of Use

Figure 8:
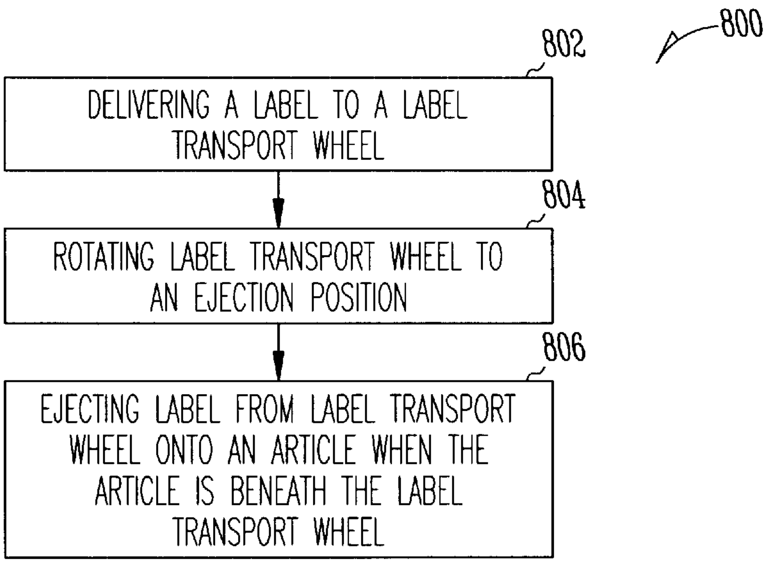
FIG. 8 is a flowchart of a method of applying a label according to one embodiment.

In summary of the above description, FIG. 8 shows a flowchart of a method 800 of applying a label according to one embodiment. Method 800 includes a first block 802 which includes delivering a label to a label transport wheel. In one embodiment, this includes label delivery apparatus 103 described above, which brings labels 104 on label strip 137 proximate to wheel 110 so that a vacuum applied at label holding sector 112 removes the label from the label strip.

Method 800 includes a second block 804 which includes rotating the label transport wheel to an ejection position. In one embodiment, this includes using a servo-motor 130 to rotate wheel 110 so that a given label holding sector 112 is positioned facing the conveyor at a pre-programmed time.

Method 800 includes a third block 806 which includes ejecting label from the label transport wheel when the article is beneath the label transport wheel. In one embodiment, this includes sensing the position of the article along the conveyor, and providing a valve member for applying a positive air pressure stream against the label.

Other embodiments include further steps such as sensing the speed of the wheel, providing an upward airflow from a nozzle 122, and so on as discussed above.

Conclusion

Labeling machines are used for applying labels to boxes, bottles, and other items. Present labeling machines are too slow and inaccurate. Accordingly, the inventors have identified a need for a high-speed labeler. In one embodiment, a label applicating system includes a label transport wheel and an air-pressure system connected to an opening in the label transport wheel. The air-pressure system applies a positive pressure at the opening to eject a label from the wheel. A motor rotates the label transport wheel so that the label is facing an article to be labeled. The opening in the wheel is configured, such that, when a label is ejected from the label-holding sector, substantially an entire major surface of the label is removed from the label holding sector simultaneously.

One aspect provides a labeling system including a label transport wheel having a label-holding sector and a motor for rotating the label transport wheel. The system further includes means for applying a momentary upward force on a bottom surface of an article to be labeled and means for ejecting a label from the label-holding sector onto a top surface of the article approximately simultaneously as the upward force is applied to the bottom surface of the article.

Among other advantages, one or more of the embodiments provide a high-speed method of applying labels to articles; provide an accurate method of applying labels to articles; provide a mechanism which applies labels axially, transversely, or other angle relative to the path of the articles being labeled; provide a relatively simple, elegant mechanism which has fewer breakdowns and maintenance problems; and/or provide a mechanism which can apply labels to flat empty cartons at high speeds.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A labeling system for labeling an article being transported along a path, the system comprising:

a label transport wheel having a label-holding sector for holding a label;

a motor for rotating the label transport wheel so that a surface of the label is facing an article to be labeled;

means for applying a momentary upward force on a bottom surface of the article; and means for ejecting the label from the label-holding sector onto a top surface of the article approximately simultaneously as the upward force is applied to the bottom surface of the article, wherein means for applying a momentary upward force comprises an air-pressure system connected to a nozzle located underneath the article.

2. The labeling system of claim 1, wherein means for ejecting comprises an air-pressure system connected to an opening in the label-holding sector.

3. The labeling system of claim 1, wherein the motor comprises a servo-motor which is controlled to rotate the label transport wheel to approximate a speed of the article along a path until the label is ejected from the label-holding sector.

4. The labeling system of claim 1, wherein the label is ejected from the label-holding sector such that an entire major surface of the label is substantially simultaneously applied to the top surface of the article.

5. A label applicating system comprising:

a wheel having a plurality of label-holding sectors around an outer surface of the wheel, each of the label-holding sectors having an opening;

an air-pressure system for applying a vacuum or a positive pressure at the opening of each of the label-holding sectors;

a motor for rotating the wheel;

a sensor for sensing a location of an article relative to the wheel as the article travels along a path relative to the wheel;

a controller for receiving a signal from the sensor indicating the location of the article and in response to the signal, sending a second signal to the motor which rotates the wheel so that one of the plurality of label-holding sectors is facing a top surface of the article when the article is positioned beneath the wheel, wherein the air-pressure system applies a first air-pressure stream at the opening of the one label-holding sector to eject a label from the one label holder-sector onto the top surface of the article; and a nozzle located beneath the path of the article and positioned approximately underneath the wheel, wherein the air-pressure system is coupled to the nozzle, and wherein the controller sends a third signal to the air-pressure system to deliver a second air-pressure stream substantially simultaneous with the first air-pressure stream, the second air-pressure stream is directed at a lower surface of the article.

6. The label applicating system of claim 5, wherein the motor comprises a servo-motor.

7. The label applicating system of claim 5, further comprising a label delivery apparatus positioned proximate the wheel for delivering a plurality of labels to the wheel.

8. A label applicating system comprising:

a label transport wheel having a plurality of label holding sectors around an outer perimeter surface of the wheel, each of the label holding sectors including an opening which is operatively coupled to an air-pressure system for applying a vacuum or a positive pressure at the opening; and a valve member proximate the label transport wheel which controls a pressure at the openings of each of the plurality of label holding sectors, wherein the valve member causes the pressure to completely change from the vacuum to the positive pressure as the label transport wheel rotates into an ejection position such that there is no overlap between the vacuum and the positive pressure at any of the plurality of label holding sectors.

9. The label applicating system of claim 8, wherein the valve member includes a plate having a first opening communicating with a vacuum and a second opening communicating with a high pressure.

10. The label applicating system of claim 8, wherein the label holding sectors include indentations which are dimensioned to receive a label therein such that at least two side surfaces of each indentation abut at least two side edges of the label.

11. A method for labeling an article being transported along a path, the method comprising:

delivering a label to a label transport member;

positioning the label transport member so that the label is above the article when the article is beneath the label transport member;

ejecting the label from the label transport member onto a top surface of the article; and applying a momentary upward force to a bottom surface of the article approximately simultaneously as the label is ejected from the label transport member by using an air-stream which goes through a nozzle located beneath the article and which is directed at a lower surface of the article.

12. The method of claim 11, wherein delivering a label comprises delivering the label to a label-holding indentation in an outer surface of a wheel.

13. The method of claim 11, wherein positioning the label transport member comprises rotating the label transport member so that a major surface of the label is facing a top surface of the article when the article is beneath the label transport member.

14. A method of labeling an article being transported along a path, the method comprising:

receiving a first signal indicating a location of the article along the path;

sending a second signal to a servo-motor in response to the first signal, the second signal causing the servo-motor to position a label-holding sector wherein a label within the label-holding sector is facing the article when the article is beneath the label-holding sector;

emitting a first air-stream which goes through a hole in the label-holding sector to eject a label from the label-holding sector onto the article; and sending a third signal to the air-pressure system in response to the first signal, the third signal causes the air-pressure system to deliver a second air-stream which goes through a nozzle located beneath the article and which is directed at a lower surface of the article.

* * * * *